US010280923B2

(12) United States Patent
Santarossa

(10) Patent No.: US 10,280,923 B2
(45) Date of Patent: May 7, 2019

(54) SUCTION/COMPRESSION ASSEMBLY FOR A WASTE MATERIAL ASPIRATION SYSTEM

(71) Applicant: JUROP S.P.A., Azzano Decimo (IT)

(72) Inventor: Danilo Santarossa, Azzano Decimo (IT)

(73) Assignee: Jurop S.P.A., Azzano Decimo (IT)

( * ) Notice: Subject to any disclaimer, the term of this patent is extended or adjusted under 35 U.S.C. 154(b) by 327 days.

(21) Appl. No.: 15/184,809

(22) Filed: Jun. 16, 2016

(65) Prior Publication Data

US 2016/0369804 A1  Dec. 22, 2016

(30) Foreign Application Priority Data

Jun. 17, 2015  (IT) .......... 102015000024766

(51) Int. Cl.
*F04C 29/12* (2006.01)
*F01C 21/10* (2006.01)
(Continued)

(52) U.S. Cl.
CPC ........... *F04C 29/124* (2013.01); *F01C 21/10* (2013.01); *F04C 18/086* (2013.01);
(Continued)

(58) Field of Classification Search
CPC .... F04C 29/124; F04C 18/126; F04C 18/086; F04C 2240/806; F04C 2240/30;
(Continued)

(56) References Cited

U.S. PATENT DOCUMENTS 2,277,977 A * 3/1942 Hesse ............... F24D 1/00 237/9 R
2,526,212 A * 10/1950 Erling ............... A01J 7/00 119/14.18
(Continued)

FOREIGN PATENT DOCUMENTS

EP  2716999   4/2014
GB  621118  *  8/1945
(Continued)

OTHER PUBLICATIONS

Italian Search Report and Written Opinion for Italian Patent Application Serial No. 102015000024766; dated Apr. 5, 2016.

*Primary Examiner* — Charles G Freay
(74) *Attorney, Agent, or Firm* — Stetina Brunda Garred & Brucker

(57) ABSTRACT

The invention relates to a suction/compression assembly for aspirating/compressing gases from/in a system to/from an external environment. The assembly comprises an operating machine, a four-way valve, an intake pipe and an exhaust pipe connecting an intake section and an exhaust section of the operating machine to said four-way valve, respectively. The assembly is characterized in that it comprises a first body, which defines, in one piece, a chamber of the operating machine, a first portion of the intake pipe and a first portion of said exhaust pipe. The assembly further comprises a second body, which defines, in one piece, a seat of the four-way valve, a second portion of the intake pipe and a second portion of the exhaust pipe. Moreover, the assembly according to the invention comprises a one-way valve arranged within the intake pipe in a position adjacent to the seat of the four-way valve.

8 Claims, 5 Drawing Sheets

(51) Int. Cl.
   *F04C 18/08* (2006.01)
   *F04C 18/12* (2006.01)
   *F16K 11/08* (2006.01)
   *F16K 15/03* (2006.01)

(52) U.S. Cl.
   CPC ............ *F04C 18/126* (2013.01); *F16K 11/08* (2013.01); *F16K 15/03* (2013.01); *F04C 2240/30* (2013.01); *F04C 2240/806* (2013.01)

(58) Field of Classification Search
   CPC ........ F04C 29/126; F04C 28/14; F16K 15/03; F16K 11/08; F01C 21/10; F04B 53/1092
   USPC .......................................................... 417/315
   See application file for complete search history.

(56) References Cited

U.S. PATENT DOCUMENTS

| | | | | |
|---|---|---|---|---|
| 3,334,652 | A | * | 8/1967 | Wheatley, Jr. .......... F16K 15/03 137/527.4 |
| 5,620,746 | A | * | 4/1997 | Snyder, Jr. .............. B41F 31/08 118/46 |
| 6,247,489 | B1 | * | 6/2001 | Maskell .................. F16K 15/03 137/269.5 |

FOREIGN PATENT DOCUMENTS

| | | |
|---|---|---|
| GB | 2437968 | 11/2007 |
| JP | 2008215336 | 9/2008 |

* cited by examiner

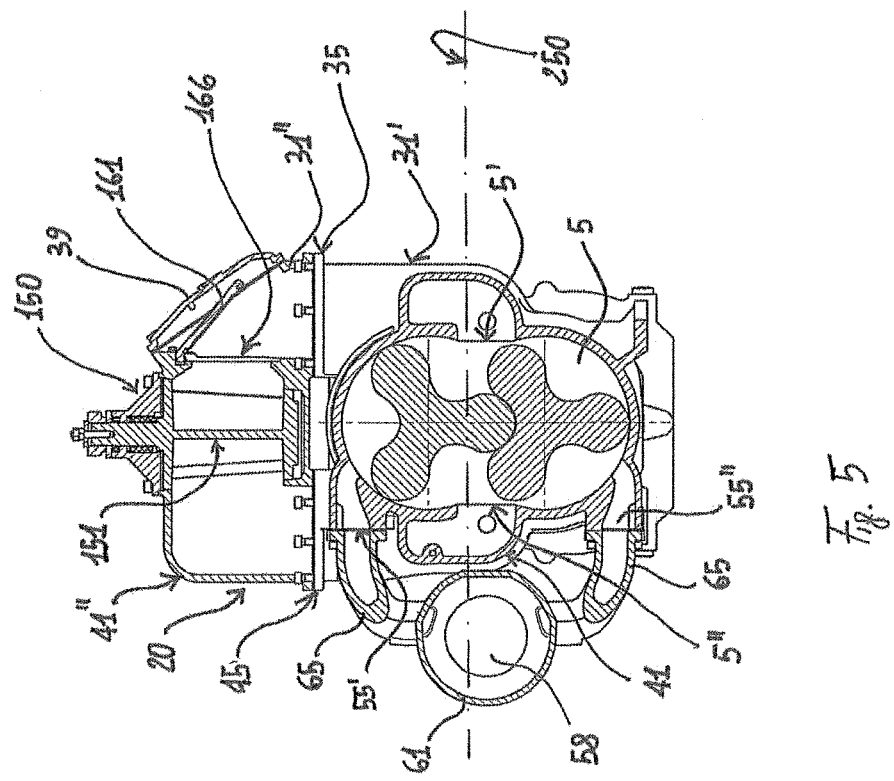
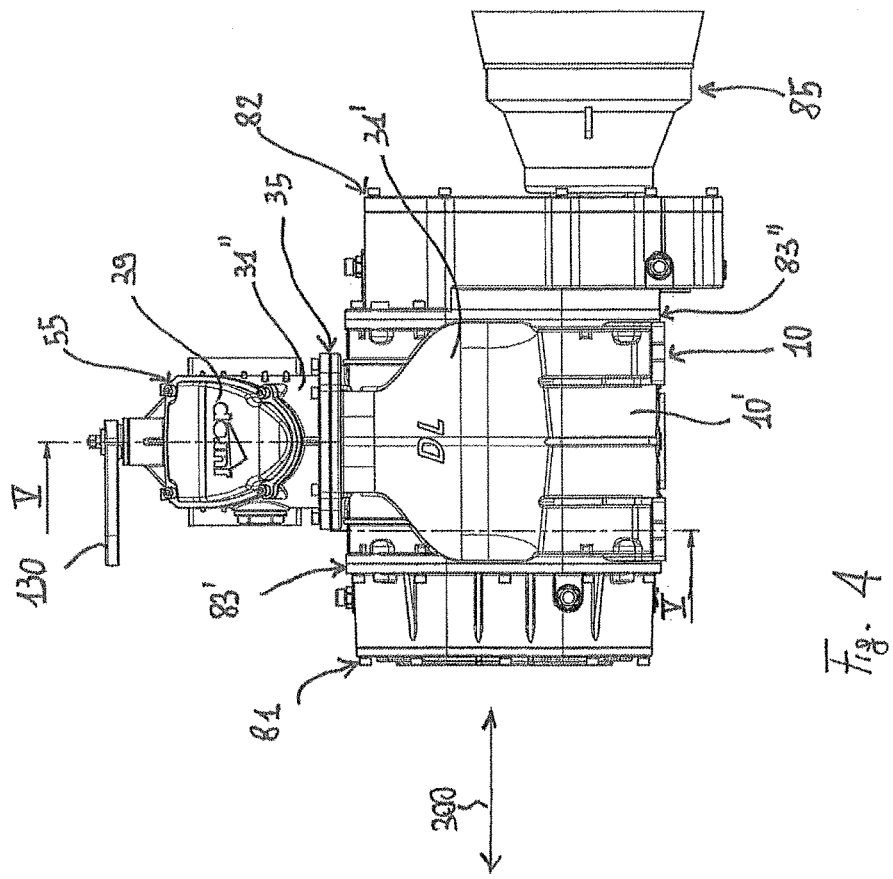

SUCTION/COMPRESSION ASSEMBLY FOR A WASTE MATERIAL ASPIRATION SYSTEM

CROSS-REFERENCE TO RELATED APPLICATIONS

The present application claims priority to Italian Patent Application No. 102015000024766 filed Jun. 17, 2015, the entirety of the disclosures of which are expressly incorporated herein by reference.

STATEMENT RE: FEDERALLY SPONSORED RESEARCH/DEVELOPMENT

Not Applicable

FIELD OF THE INVENTION

The present invention falls within the scope of the manufacture of equipment and/or systems for aspirating waste material in liquid, solid, sludge form, etc. In particular, the invention relates to a suction/compression assembly connectable to a system operating in vacuum and/or under pressure.

BACKGROUND ART

In the manufacture of equipment for cleaning and/or the collection and treatment of waste it is known to use intake/compression assemblies configured to generate the vacuum in a collection system, which may be for example a cistern, and/or to compress air in the system itself. More specifically the term "intake/compression assembly" means the set formed by an operating machine and by the components needed to connect the same to any system in order to aspirate gas from the system or compress it into the same preventing escapes/leaks of the gas itself.

Known intake assemblies include, in most cases, a lobe-type volumetric compressor configured to transfer a mass of gas from an intake section to an exhaust section of the compressor without increasing the pressure thereof. In some cases, the volumetric compressor is provided with a cooling gas injection system intended to lower the temperature of the compressor members. In some cases, vane compressors are provided which carry out a gas compression in the transfer to the exhaust section.

In all cases, it is normally contemplated to use a four-way valve defined by a prismatic block which accommodates the flow diverting means at its interior. Such a block normally defines a first opening that is connected to the system, a second opening in communication with the external environment, a third opening connected to an inlet of the operating machine through an intake pipe and a further opening connected to outlet of the operating machine itself through an exhaust pipe. The intake pipe and the exhaust pipe are traditionally made each in one piece and each of them is connected to the operating machine and to the valve block through flanged connections. The flow diverting means of the four-way valve are switchable to different operating configurations depending on the operating conditions required by the intake/compression assembly.

The flow diverting means are traditionally configured to take a first characteristic position, whereby the system is in communication with the intake pipe and the exhaust pipe is in communication with the external environment, and a second characteristic position where, upon being reached, the system is in communication with the exhaust pipe while the external environment is in communication with the intake pipe.

A suction/compression assembly usually comprises a one-way valve which is intended to allow the system to seal, at the end of the suction phase and at the end of the air blowing step into the system. In traditional solutions, the one-way valve is of the "ball" type and is installed in the exhaust pipe, i.e. in an intermediate position between the four-way valve block and the exhaust section of the operating machine. During the suction phase, the gas escaping from the exhaust pipe raises the ball of the one-way valve to be exhausted into the environment. When the suction is interrupted, the ball valve falls towards the exhaust section of the operating machine due to the environmental pressure higher than that of the system, allowing the system to seal. A similar behavior of the valve is obtained when the assembly is used to introduce air under pressure within the system. In this case, the valve is raised by the flow directed into the system, while it falls towards the exhaust section of the operating machine as soon as the same is stopped.

It was observed that in suction/compression assemblies, whether they are provided or not with a cooling air injection system, the one-way valve is a critical issue particularly in terms of maintenance costs. The ball, made of polymeric material, which constitutes the one-way valve is impinged by air/gas at high temperature that markedly reduce the life thereof. Therefore, the ball must be replaced after a time interval that substantially depends on the conditions in which the suction/compression assembly works.

It was also observed that when the assembly is provided with a cooling air injection system, a directional valve arranged in the exhaust pipe is only effective for the sealing of a pressurized system, but totally ineffective for the sealing of a vacuum system. In fact, at the end of the air suction from the system, the pressure of the injection system is higher than that of the system and this would lead to an air flow from the injection system to the vacuum system. In order to prevent this undesired condition, pneumatic valves are used, adapted to block the injection at the end, when the system reaches the predetermined vacuum level. The use of pneumatic valves, however, has a considerable impact on the implementation costs and subsequently on those related to maintenance.

In view of the above considerations, the main task of the present invention is to provide a suction/compression assembly which allows to overcome the drawbacks of the prior art described above. Within this task, a first object of the present invention is to provide a suction/compression assembly consisting of a relatively small number of components. Another task of the present invention is to provide a suction/compression assembly which allows the sealing of a system, being it under pressure or vacuum, irrespective of the presence or not of a cooling gas injection system. Last but not least, an object of the present invention is to provide a suction/compression assembly that is compact, reliable and easy to be implemented in a cost-effective manner.

SUMMARY OF THE INVENTION

The object of the present invention is a suction/compression assembly for aspirating gases from a system or for compressing gases into the system itself. The assembly according to the invention comprises:

an operating machine, which includes a chamber in which operative means are housed for transferring gas from an intake section of the chamber to an exhaust section of the same chamber;

a four-way valve comprising a seat and flow diverting means housed in said seat; the seat comprises a first opening connectable to said system, a second opening connectable to an external environment, a third opening connected to the intake section by means of an intake pipe and a fourth opening communicating with the exhaust section through an exhaust pipe.

The assembly according to the invention is characterized in that it comprises:

a first body which defines, in one piece, the chamber of the operating machine, a first portion of the intake pipe and first portion of the exhaust pipe;

a second body which defines, in one piece, the seat of the four-way valve, a second portion of the intake pipe and a second portion of the exhaust pipe; in particular, the first portion of the intake pipe is hydraulically connected to the second portion of the intake pipe and the first portion of the exhaust pipe is hydraulically connected to the second portion of said exhaust pipe.

The assembly according to the invention further comprises a one-way valve arranged within the intake pipe in a position adjacent to the third opening of the seat of the four-way valve. It has been observed that the new position assigned to the one-way valve allows to obtain the seal in any operative condition of the system while increasing the life of the valve itself. At the same time, the intake/compression assembly is obtained by assembling a markedly reduced number of components for the benefit of manufacturing and maintenance costs.

BRIEF DESCRIPTION OF THE DRAWINGS

Further features and advantages of the present invention will become more apparent from the following detailed description, given by way of a non-limiting example and shown in the accompanying figures, in which:

FIG. 4 is a lateral view of the assembly in FIG. 1;

FIG. 5 is a second view according to plane V-V in FIG. 4;

DETAILED DESCRIPTION

Figure 2:
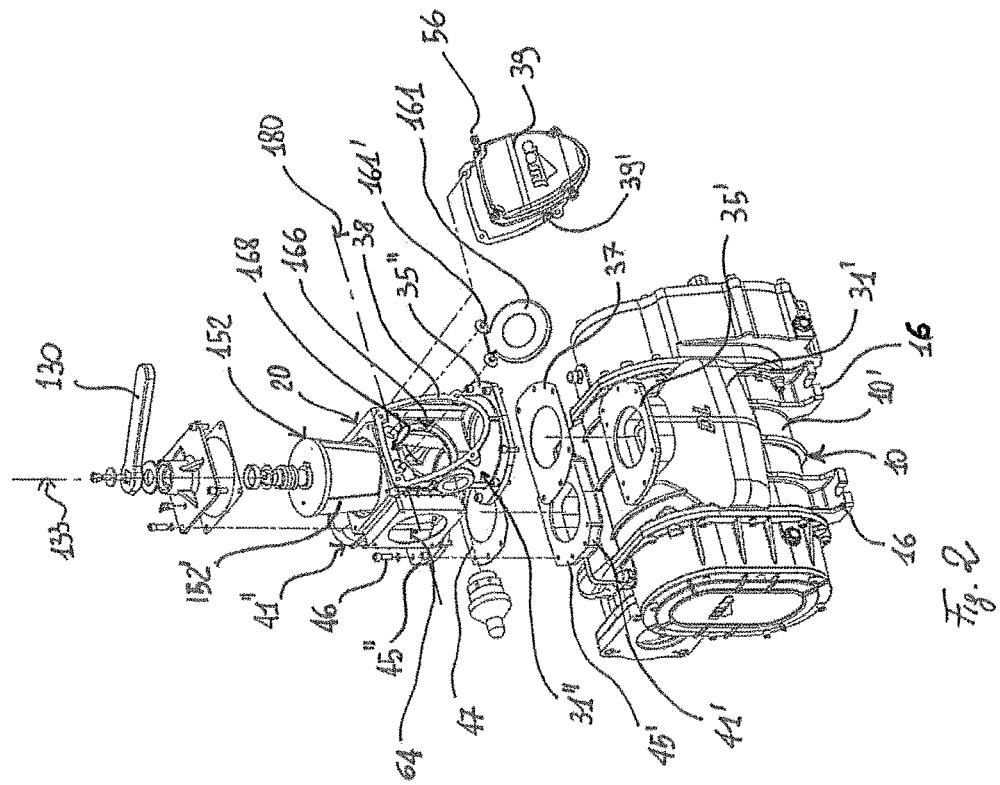
FIG. 2 is a partially exploded view of the assembly in FIG. 1.

With reference to the above figures, the suction/compression assembly according to the invention is generically indicated with reference numeral 1. Such an assembly 1 can be used to aspirate gases (such as air) from a system 100, or alternatively to introduce air under pressure (compressed) within the system itself.

Assembly 1 comprises an operating machine, which includes a chamber 5 (shown in FIG. 3) inside of which operative means are housed, configured to transfer gas from an intake section 5' to an exhaust section 5" both defined by the chamber itself. In a first possible embodiment, the operating machine can be of volumetric type, that is, configured to transfer gases from the intake section 5' to the exhaust section 5" without compressing the gas itself. To this end, with reference to FIG. 3, the operative means may comprise a pair of lobe rotors 26 having parallel axes. In an alternative embodiment, chamber 20 and the operative means 25 may be configured so as to achieve a compression of the gas in the passage between the intake section 5' and the exhaust section 5" similarly to what happens, for example, in a rotary vane compressor.

Figure 6:
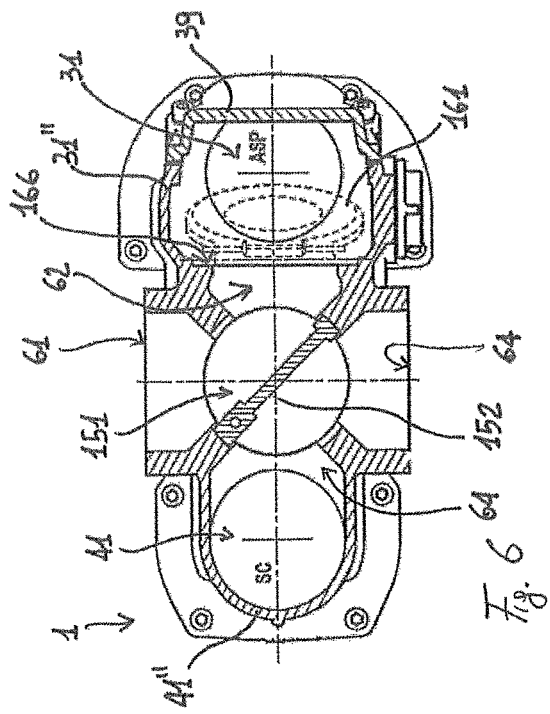
FIGS. 6 and FIG. 7 are sectional views according to line X-X in FIG. 3 relating to a first possible operating configuration and to a second possible operating configuration of the assembly in FIG. 1, respectively.

Assembly 1 according to the invention further comprises a four-way valve 150 comprising a seat 151 (shown in FIG. 2) and flow diverting means 152 operatively housed within seat 151. With reference for example to FIG. 6, such a seat 151 defines a first opening 61 connectable to the system 100 and a second opening 64 connectable to the external environment. Seat 151 also defines a third opening 62 connected to the intake section 5' of chamber 5 through an intake pipe 31 and a fourth opening 63 connected to the exhaust section 5" through an exhaust pipe 41.

Assembly 1 according to the invention comprises a first body 10, which defines, in one piece, chamber 5, a first portion 31' of the intake pipe 31 and a first portion 41' of the exhaust pipe 41. Assembly 1 also comprises a second body 20 which defines, in one piece, a second portion 31" of the intake pipe 31, a second portion 41" of the exhaust pipe 41 and seat 151 of said four-way valve 150. The first body 10 and second body 20 are connected to each other. More precisely, the first portion 31' of the intake pipe 31, defined by the first body 10, is hydraulically connected to the second portion 31" of the intake pipe 31 defined by the second body 20. Likewise, the first portion 41' of the exhaust pipe 41, defined by the first body 10, is hydraulically connected to the second portion 41" of the exhaust pipe 41 defined by the second body 20. For the purposes of the present invention, the expression "hydraulically connected" is meant to indicate a mechanical connection between two portions of a pipe such that a fluid flows through a portion of the pipe to the other without leaks.

Assembly 1 according to the invention is further characterized in that it comprises a one-way valve arranged within the intake pipe 31 in a position adjacent to the third opening 62 of seat 151 of the four-way valve 150. The one-way valve preferably is of the "clapper" type comprising a closing element 161 movable between a closing position and an opening position (shown in FIG. 3). Preferably, the second portion 31" of the intake pipe 31 defines a seat 166 in which the closing element 161 is inserted and abuts when it is in a "closing position". Basically, seat 166 has a shape geometrically conjugated to that of the closing element 161 in order to ensure the sealing of the fluid/gas in the closing position. The movement of the closing element 161 is substantially determined by the difference in pressure existing between upstream and downstream of the element itself, with respect to the flow direction in the intake pipe 31 indicated in FIG. 3 by the arrow.

Unlike the known solutions, the one-way valve is advantageously arranged at the beginning of the intake pipe 31, with respect to the direction of the intake flow, in a position adjacent to an opening of seat 151 of the four-way valve 150. This position advantageously ensures the seal in any condition of use of the system, as hereinafter described in the description of FIGS. 11 and 13. It is also noted that when flowing through the intake pipe, the fluid/gas has lower temperatures than those reached in chamber 5 and/or in the exhaust pipe 41. This, for the benefit of a longer life of the one-way valve.

Figure 1:
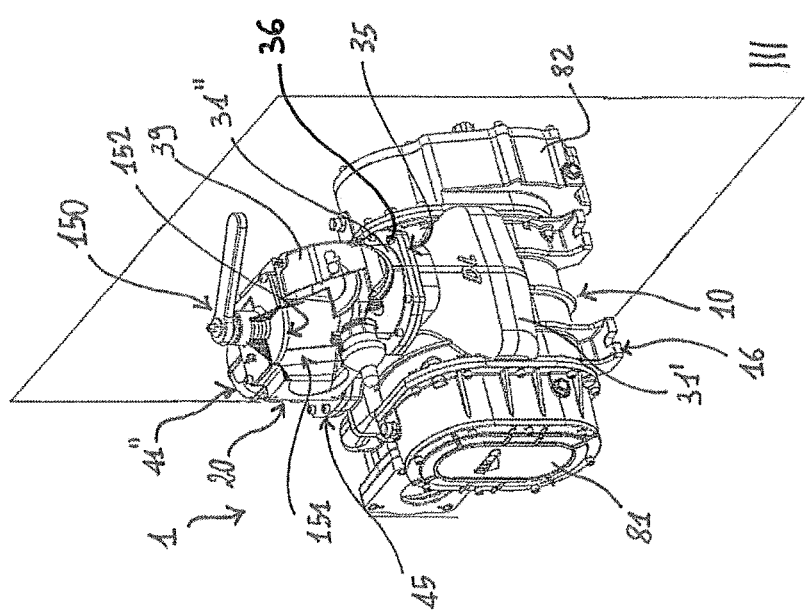
FIG. 1 is a perspective view of a first possible embodiment of an intake assembly according to the present invention.
Figure 3:
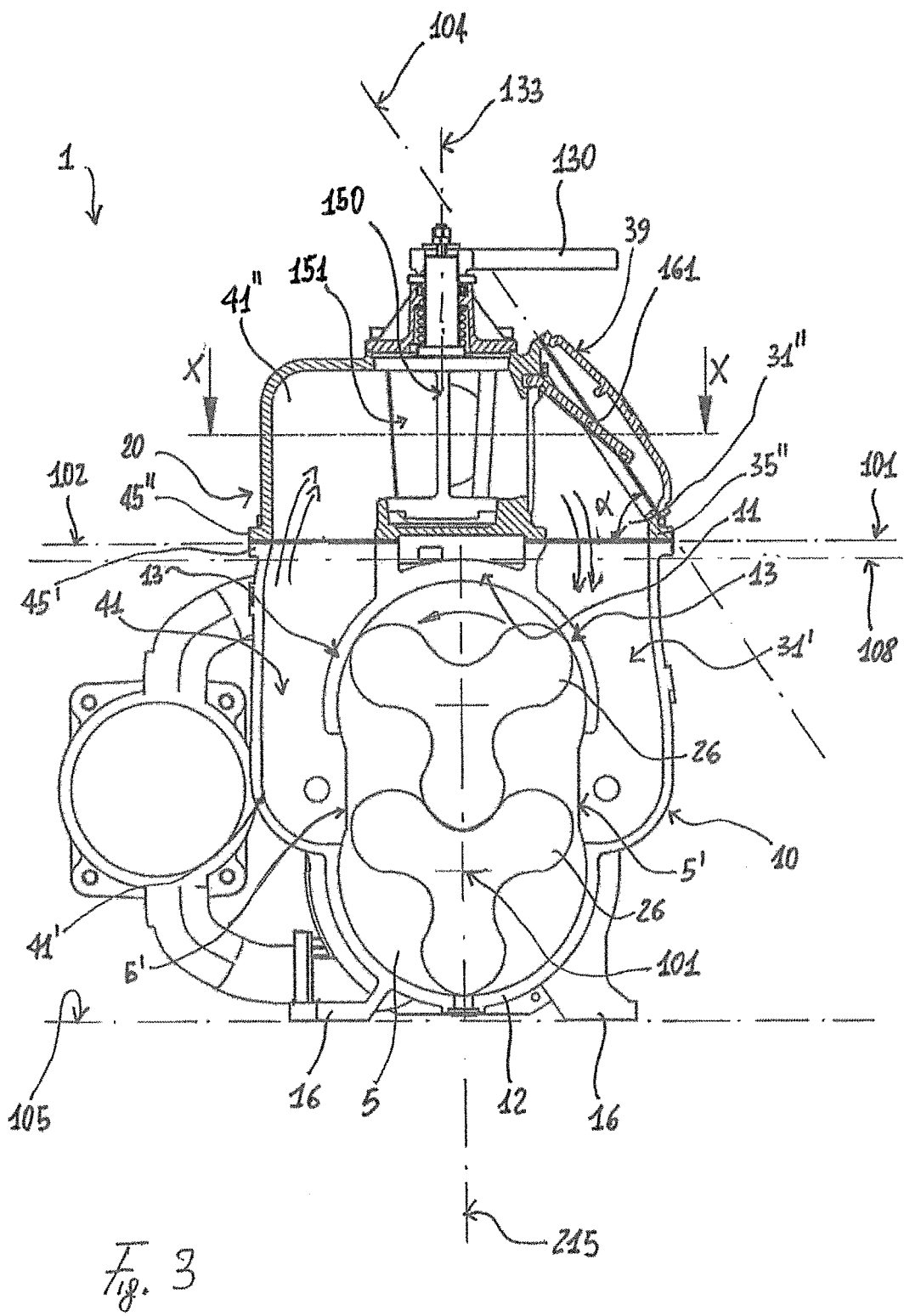
FIG. 3 is a sectional view according to plane III in FIG. 1.

FIG. 1 is a perspective view of a possible embodiment of assembly 1 according to the invention. In particular, this figure shows the particularly compact configuration of assembly 1 obtained, in fact, through the connection of only two bodies 10, 20. FIGS. 2 and 3 are a partially exploded view and a sectional view of assembly 1 in FIG. 1, respectively. With regard to the four-way valve 150, the flow diverting means 152 have a configuration known per se and therefore not described in detail. The diverting means 152 comprise at least one body 152' rotating about an axis 133 between at least a first operating position and a second operating position. Still according to a solution per se known, the rotation of body 150' can be preferably implemented by means of a lever 130.

The first body 10 comprises a central part 10' which defines chamber 5 of the operating machine. Such a chamber 5 mainly extends along a main extension direction indicated with reference numeral 300 in FIG. 4. The transverse section of chamber 5, as seen on a plane orthogonal to said extension direction 300, may take a different configuration according to the type of operative means installed in the same. In the example shown in FIG. 3, these operative means comprise a pair of lobe rotors 26 with parallel axes. Accordingly, chamber 5 has an elliptic transverse section. If the use of a vane rotor is contemplated, then chamber 5 would take a different configuration. In general, the operative means are configured to rotate about a rotation axis 101 which is parallel to the extension direction 300 of chamber 5.

The first portion 31' and the second portion 31" of the intake pipe 31 are connected by means of a first flange connection 35. Likewise, the first portion 41' and the second portion 41" of the exhaust pipe 41 are connected by means of a second flange connection 45. Specifically, the first flange connection 35 is defined by a flat flange end 35' of the first portion 31' connected, through screw connecting means 36, to a flat flange end 35" of the second portion 31" of the intake pipe 31 (see FIG. 1). The first flange connection 35 defines a first contact and sealing plane 101 (shown in FIG. 3) between the mutually connected flat flange ends 35', 35". Preferably, a sealing element 37 is interposed between the two flange ends 35', 35" of the first flange connection 35 (see FIG. 2).

Again with reference to FIG. 2, in a similar manner, the second flange connection 45 is defined by a flange end 45' of the first portion 41' of the exhaust pipe 41 which is connected, through screw connecting means 46, to a second flange end 45" of the second portion 41" of the intake pipe 41 itself. The second flange connection 45 defines a second contact and sealing plane 102 (see FIG. 3) between the mutually connected flat flange ends 45', 45". Preferably, a sealing element 47 is also interposed between the two flange ends 45', 45" of the second flange connection 45.

With reference to the sectional view in FIG. 3, according to a preferred embodiment, the first flange connection 35 and the second flange connection 45 are configured such that the first plane 101 is parallel and preferably coplanar with the second contact and sealing plane 102. Preferably, the two planes 101, 102 are defined in a position just above the central part 10' of the first body 10 in order to impart greater compactness to assembly 1. More precisely, the distance between said planes 101,102 and a reference plane 108 parallel thereto and tangent to the upper portion 11 of the central part 10' is preferably less than 15 mm.

Body 10 of assembly 1 preferably comprises fixing/support means 16 which define a fixing plane 105. Preferably, the two flange connections 35 and 45 are configured such that the first plane 101 and the second contact and sealing plane 102 are parallel to the fixing surface 105. Again with reference to FIG. 3, the fixing plane 105 is defined in a position just below the lower portion 12 of the central part 10' of the first body 10.

Again with reference to FIG. 3, it is observed that the intake section 5' and the exhaust section 5" are defined in a substantially specular position with respect to a reference plane 215 on which the rotation axis 101 of rotors 26 lies and substantially orthogonal to the fixing plane 105. Preferably, the first portion 31' of the intake pipe 31 and the first portion 41' of the exhaust pipe have a specular configuration with respect to the reference plane 215 itself. In this regard, each of said first portions 31', 41' is defined, at least partially, by a lateral surface 13 of the central part 10' of body 10. This solution contributes to compactness of body 10 and thereby of assembly 1.

With reference to FIGS. 4 and 5, assembly 1 further comprises a first head 81 and a second head 82 connected to opposite sides of the first body 10 to close chamber 5 along said extension direction 300. According to a solution known per se, the two heads 81, 82 are configured to internally house support means for the ends of rotors 26 mentioned above and/or transmission means configured to rotate the rotors themselves. In this regard, in the example in FIG. 4, the transmission means (not shown) housed in the second head 82 are connected to an external motor through a mechanical transmission 85, such as Cardan. Again according to a solution per se known, each of the two heads 81, 82 is connected to body 1 that defines chamber 5 through a corresponding flange connection 83', 83".

With reference to FIG. 3, preferably, the intake pipe 31 comprises a removable part 39 connected to the second portion 31" of the intake pipe itself defined by the second body 20. The second part 39 is removably connected to the second portion 31" to allow, once removed, access to the one-way valve for possible maintenance and/or inspection operations of the valve itself. During normal use of assembly 1, the second part 39 is hydraulically connected to the second portion 31" in order to ensure the sealing of the fluid inside the intake pipe 31. The second portion 31" is, therefore, a part which substantially remains fixed also during the maintenance/inspection operations to valve 160. Hereinafter, the second portion 31" of the intake pipe will be also indicated by the expression fixed portion 31".

As can be seen in the exploded view in FIG. 2, the fixed portion 31" of the intake pipe 31 defined by the second body 20 is connected to the first portion 31' of the first body 10 through the first flange connection 35 defined above and is connected to the removable part 39 through a further flange connection 55. The fixed part 31" also configures/defines a first flat sealing surface 38, while the removable part 39 configures/defines a second flat sealing surface 39'. The removable part 39 is connected to the first part 38 by means of further connecting means, preferably screw, so that the first flat surface 38' and the second flat surface 39' are in contact, thereby defining a further contact and sealing plane 104 shown in FIG. 3. In particular, the two flat surfaces 38 and 39' are configured so that plane 104 is inclined by an angle α with respect to the first plane 101 and/or to the second contact and sealing plane 102 defined above.

According to a preferred embodiment, the two flat surfaces 38 and 39' are configured so that plane 104 is inclined toward seat 151 of the four-way valve 150. In particular, the value of angle α is preferably in a range of between 45° and 75° and even more preferably in a range of between 50° and 65°. In the example in FIG. 3, for example, angle α has a value of about 55°.

With reference to the exploded view in FIG. 2, the fixed part 31" of the intake pipe 31 is open at the top and delimited by the flat surface 38' which defines the inclined plane 104. The fact that the latter is oriented toward seat 151 of the valve allows on one hand to easily implement the seat 166 for the closing element 161 of the one-way valve 160, as well as the seat 168 for the installation of the pin that defines the rotation axis 180 of the closing element 161 itself. These seat may be made, for example, through a milling operation carried out with traditional tools just by virtue of the easy unhindered access to the area where these seat must be defined. As a result, the installation of the closing element 161 will be overly simple. In this regard, fixing means 161' are provided for fixing said pin of the closing element 161 into seat 166 indicated above (see FIG. 2).

According to another aspect shown in FIG. 3, the removable part 39 has a preferably concave shape evaluated with respect to the contact and sealing plane 104 defined by the two flat surfaces 38, 39' defined above. This concave shape is intended to increase the useful space for the movement of the closing element 161 towards the open position. Therefore, the concave shape allows to configure the two flat surfaces 38', 39' so that the contact and sealing plane 104 defined by their connection is as much as possible inclined towards seat 151 of the four-way valve 150. It is also noted that the inclination of the flat surfaces 38, 39' and the concave shape provided for the removable part 39 have a synergistic effect also in fluid dynamic terms as they advantageously direct the intake flow towards chamber 5 as indicated by the arrows in FIG. 2.

With reference to FIG. 5, according to a preferred embodiment, assembly 1 comprises a gas injection system 60 operatively connected to chamber 5 of the operating machine. More precisely, the injection system 60 comprises a main manifold 61 connectable to an external environment. The air is pushed from the external environment towards the manifold by pressure difference. The injection system 60 also comprises injection ducts 65 which branch off from the main manifold 61. Chamber 5 defines injection openings 55', 55" each of which is hydraulically connected to one of the injection ducts 65.

According to a preferred embodiment, chamber 5 defines one or more injection openings 55' above a reference plane 250 parallel to said support plane 105 and passing through the intake section 5' and the exhaust section 5" defined by chamber 5. Again according to this embodiment, chamber 5 defines one or more injection openings 55" below said reference plane 250. Preferably, each port 55' defined below said reference plane 250 is specular to a corresponding port 55" defined above the same reference plane 250.

The injection system 60 also comprises a one-way injection valve 58, preferably of the "clapper" type (not shown). The injection valve 58 is configured to allow the passage of the injection air through the injection ducts 65 when the air injection pressure is higher than the pressure inside chamber 5.

Consequently, the injection valve 58 closes when the pressure inside chamber 5 is higher than the external one.

Figure 10:
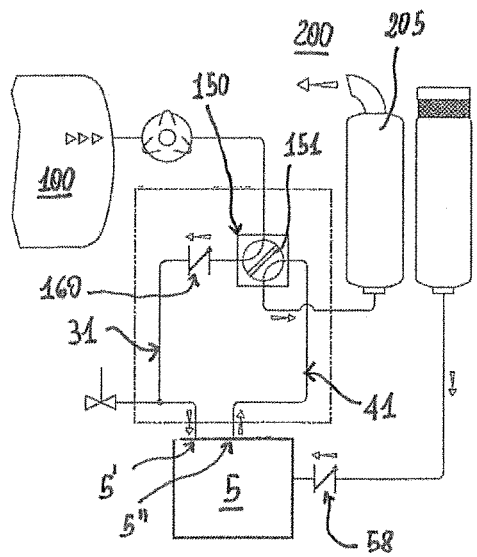
FIG. 10 and FIG. 11 are operating diagrams corresponding to the operating configuration in FIG. 6 and to the operating configuration in FIG. 7, respectively.

FIGS. 6 and 10 refer to a first possible operating configuration of assembly 1 through which a vacuum condition is achieved inside the assembly. With reference to FIG. 6, in this configuration, the flow diverting means 152 are set in a first operating position as a result of which, system 100 is in communication with the intake pipe 31 through the first opening 61 and the third opening 62 defined by the seat of the four-way valve 150. Moreover, as a result of said first operating position, the exhaust pipe 41 is in communication with the external environment 200 through the fourth opening 63 and the second opening 64. Following the actuation of the operating means of the operating machine, the gas present into system 100 is aspirated into the intake pipe 31 through the first opening 61 and the third opening 62. The suction of the gas causes the opening of the one-way valve through which the gas begins its flow in the intake pipe 31 to reach the intake section 5' of chamber 5. The gas is then transferred, as a result of the rotation of the lobes, to the exhaust section 5" of chamber 5, and then into the exhaust pipe 41. The gas passes again through the four-way valve 150 and reaches the external environment, possibly through a muffler 205. With reference to FIG. 10, it is seen that in this first operating configuration, the injection valve 58 of the injection manifold is open, thus allowing the injection of air inside chamber 5 for lowering the working temperatures.

Figure 7:
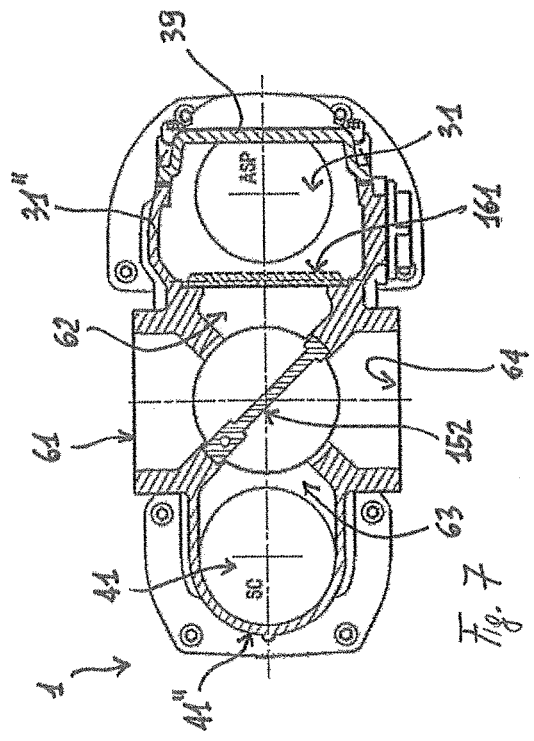
Figure 8:
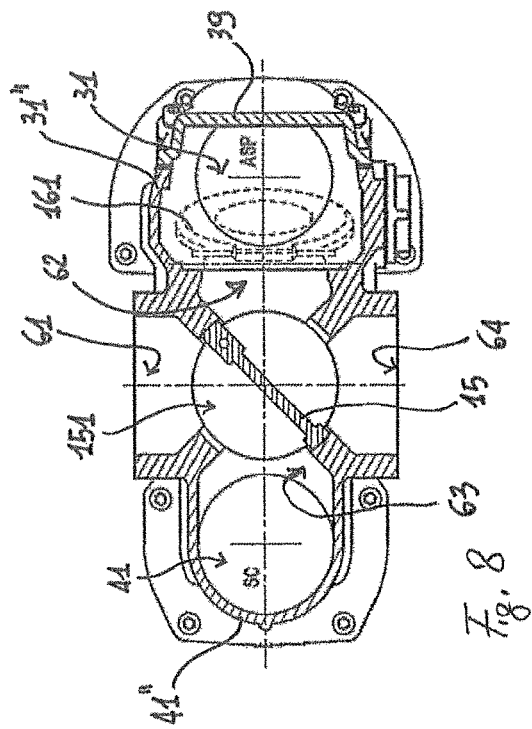
FIG. 8 and FIG. 9 are sectional views according to line X-X in FIG. 3 relating to a third and a fourth possible operating configuration of the assembly in FIG. 1, respectively.
Figure 11:
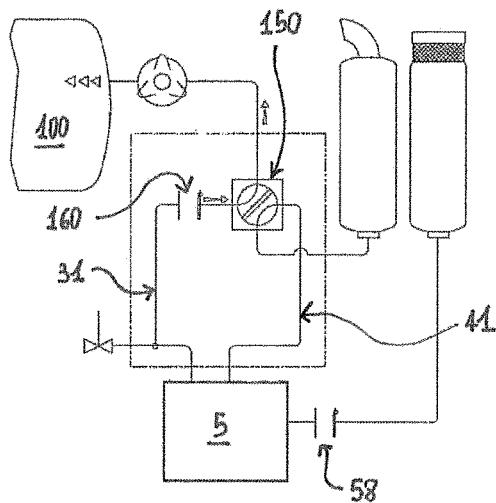
Figure 12:
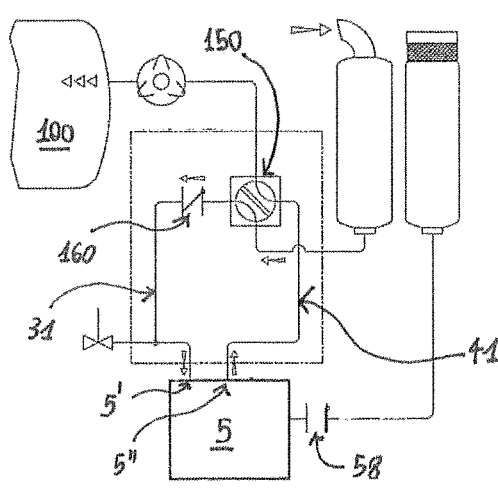
FIG. 12 and FIG. 13 are operating diagrams corresponding to the operating configuration in FIG. 8 and to the operating configuration in FIG. 9, respectively.

FIGS. 7 and 11 refer to a second operating configuration that is normally maintained by assembly 1 at the end of the suction operation from the system described above (FIGS. 6 and 10). In this second configuration, the flow diverting means 152 of the four-way valve 150 still maintain the first operating position. When the aspiration is interrupted, following the stop of the operating means of the operating machine, the one-way valve closes due to the pressure difference between the system (under vacuum) and the intake pipe (at substantially atmospheric pressure). In this second configuration, also the injection of air into chamber 5 is stopped (injection valve closed).

It is seen that when the operating means of the operating machine are stopped, the closing element 161 of the one-way valve moves/closes as a result of gravity alone. The particular position assigned to the valve (adjacent to the third section 62 of seat 151 of the four-way valve 150) does not require further closing means. Basically, said closing element 161 only moves due to the pressure difference between upstream and downstream of the one-way valve 160.

FIGS. 8 to 12 refer to a third operating configuration through which air under pressure is introduced into system 100. Basically, in this third operating configuration, assembly 1 works as a "compression assembly". In this operating configuration, the flow diverting means 151 are set into a second operating position as a result of which, system 100 is in communication with the exhaust pipe 41 through the first opening 61. Moreover, as a result of the second operating position of the flow diverting means 151, the intake pipe 31 is in communication with the external environment 200 through the third opening 62 and the second opening 64. Following the actuation of the operating means of the operating machine, the gas is aspirated from the external environment 200 through the intake pipe 31. The aspiration of the gas causes the opening of the one-way valve 160. Through the intake pipe 31, the gas reaches the intake section 5' of chamber 5 to be transferred, as a result of the rotation of rotors 26, to the exhaust section 5" and then into the exhaust pipe 41. The gas exiting from the exhaust pipe 41 passes again through the four-way valve 150 and reaches system 100. It is noted that if the operating machine comprises lobe rotors, the increase in the gas pressure inside the system is reached by the accumulation of air within the same. In this "under pressure" operating configuration, the injection valve 58 closes, thereby preventing the pressurized air from escaping from chamber 5 through the injection port 55', 55" and the injection ducts 65.

Figure 9:
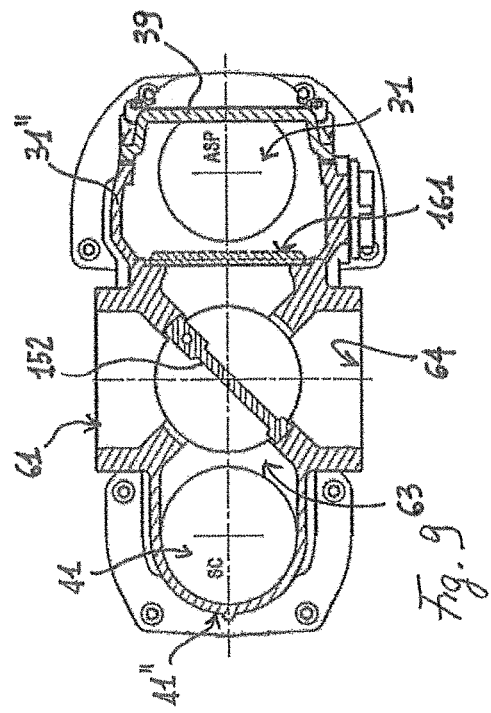
Figure 13:
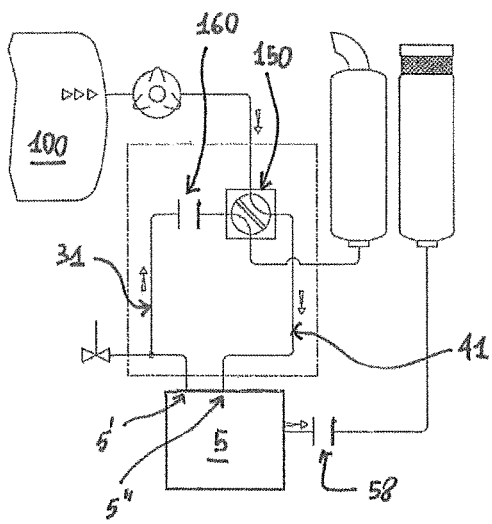

FIGS. 9 and 13 refer to a further operating configuration of assembly 1 through which system 100 is maintained in pressure upon the shutdown of the operating machine. When the latter is switched off, the pressure inside the intake pipe 31 is higher than the external environment 200 pressure. As a result of this pressure difference, the one-way valve 160 closes. For the same principle, also the injection valve 58 closes. Thereby, the intake pipe 31, the operating machine and the exhaust pipe 41 maintain the same pressure of system 100.

The solutions adopted for the intake/compression assembly according to the invention allow to fully achieve the intended task and objects. In particular, the assembly is particularly compact and reliable and implemented through a reduced number of components. The positioning of the one-way valve inside the intake pipe and in a position adjacent to the seat of the four-way valve allows a reliable operation of the intake/compression assembly in any operating conditions of the system.

The invention claimed is:

1. A suction/compression assembly for aspirating/compressing gases associated with a system, said assembly comprising:

an operating machine, which includes a chamber in which operative means are housed for transferring said gas from an intake section to an exhaust section of said chamber;

a four-way valve comprising a seat and flow diverting means housed in said seat, said seat comprising a first opening connectable to said system, a second opening connectable to an external environment, a third opening connected to said intake section by means of an intake pipe and a fourth opening communicating with said exhaust section through an exhaust pipe, wherein said assembly comprises:

a first body, which defines, in one piece, said chamber of said operating machine, a first portion of said intake pipe and first portion of said exhaust pipe;

a second body, which defines, in one piece, said seat of said four-way valve, a second portion of said intake pipe and a second portion of said exhaust pipe, said first portion of said intake pipe being hydraulically connected to said second portion of said intake pipe and said first portion of said exhaust pipe being hydraulically connected to said second portion of said exhaust pipe, and wherein said assembly comprises a one-way valve arranged within said intake pipe in a position adjacent to said third opening of said seat of said four-way valve, said intake pipe comprising a removable part connected to said second portion of said intake pipe, said removable part allowing said one-way valve to be accessed, once said removable part is removed from said second portion of said intake pipe, and wherein said second portion of said intake pipe is connected to said removable part through a connection defined between a first flat surface of said removable part and a second flat surface of said second portion, said flat surfaces being configured so as to define a contact and sealing plane inclined towards said seat of said four-way valve.

2. An assembly according to claim 1, wherein said one-way valve is of the "clapper" type comprising a closing element movable between a closing position and an opening position, said second portion of said intake pipe defining a seat in which said closing element is inserted and abuts when it is in said closing position.

3. An assembly according to claim 1, wherein said first portion of said intake pipe includes a first intake flange and said second portion of said intake pipe includes a second intake flange connected to the first intake flange and wherein said first portion of said exhaust pipe includes a first exhaust flange and said second portion of said exhaust pipe includes a second exhaust flange connected to the first exhaust flange.

4. An assembly according to claim 3, wherein said first and second intake flanges collectively define a first contact and sealing plane therebetween, and wherein the first and second exhaust flanges collectively define a second contact and sealing plane therebetween, wherein said first contact and sealing plane is parallel to said second contact and sealing plane.

5. An assembly according to claim 4, wherein said contact and sealing planes are coplanar.

6. An assembly according to claim 1, wherein said removable part has a concave configuration viewed with respect to said contact and sealing plane.

7. An assembly according to claim 1, wherein said first body defines a fixing plane, said intake section and said exhaust section of said chamber being defined in a position which is substantially specular with respect to a reference plane on which a rotation axis of said operative means lays and which is orthogonal to said fixing plane.

8. An assembly according to claim 7, wherein said first body comprises a central part, which defines said chamber of said operating machine, said first portion of said intake pipe and said first portion of said exhaust pipe are configured and arranged so as to be mirror images of each other with respect to said central part, each of said first portions being partially defined by a portion of said central part.

* * * * *